(12) United States Patent
Dolbear et al.

(10) Patent No.: US 7,844,000 B2
(45) Date of Patent: Nov. 30, 2010

(54) METHOD AND APPARATUS FOR VIDEO ENCODING

(75) Inventors: Catherine Mary Dolbear, Reading (GB); Paola Marcella Hobson, Alton (GB)

(73) Assignee: Motorola, Inc., Schaumburg, IL (US)

( * ) Notice: Subject to any disclaimer, the term of this patent is extended or adjusted under 35 U.S.C. 154(b) by 1989 days.

(21) Appl. No.: 10/070,069

(22) PCT Filed: Jul. 9, 2001

(86) PCT No.: PCT/EP01/07886

§ 371 (c)(1),
(2), (4) Date: Mar. 4, 2002

(87) PCT Pub. No.: WO02/05567

PCT Pub. Date: Jan. 17, 2002

(65) Prior Publication Data

US 2003/0016752 A1      Jan. 23, 2003

(30) Foreign Application Priority Data

Jul. 11, 2000   (GB) ................................. 0017032.4

(51) Int. Cl.
*H04N 7/18*   (2006.01)

(52) U.S. Cl. ............................. 375/240.25; 375/240.26

(58) Field of Classification Search ..............................
375/240.01–240.29
See application file for complete search history.

(56) References Cited

U.S. PATENT DOCUMENTS

| 6,037,985 | A  | * | 3/2000 | Wong ..................... 375/240.03 |
| 6,580,754 | B1 | * | 6/2003 | Wan et al. .............. 375/240.01 |
| 6,603,883 | B1 | * | 8/2003 | Hamanaka .................. 382/239 |

FOREIGN PATENT DOCUMENTS

| EP | 0 644 695 A2 | 3/1995 |
| EP | 0 739140 A2 | 10/1996 |
| WO | WO 9933274 A1 | 7/1999 |

(Continued)

OTHER PUBLICATIONS

Katata H et al: "Temporal Scalability Based on Image Content" International Organization for Standradization—Organisation Internationale De Normalisation, Jul. 1995, pp. 1-2.

(Continued)

*Primary Examiner*—Andy S Rao
(74) *Attorney, Agent, or Firm*—Steven R. Santema; Terri S. Hughes; Valerie M. Davis

(57) ABSTRACT

A method of enchancing a video bit stream using temporal scalability, wherein the number of bits or a temporal position of a bidirectionally predicted picture in an enhancement layer is determined with reference to a corresponding characteristic of pictures in another layer of layers, such as a base layer, of the video bit stream and the peak signal to noise ration of the B picture is matched to that of the pictures in the layer below. By endeavouring to align the characteristics of the bidirectionally predicted picture or pictures with the existing picture or pictures in the lower layer or layers, and improved video sequence can be encoded and decoded for viewing by a user.

10 Claims, 10 Drawing Sheets

Illustration of B picture prediction dependencies

FOREIGN PATENT DOCUMENTS

WO      WO 0005898 A2    2/2000

OTHER PUBLICATIONS

Ishtiaq F et al: "A Rate Control Method for H.263 Temporal Scalability" Image Processing, 1999 ICIP 99. Proceedings 1999 International Conference on Kobe, Japan Oct. 24-28, 1999, Piscataway, NJ USA, IEEE USA Oct. 24, 1999 pp. 280-284.

Hemami S S: "Distortion Analyses for Temporal Scalability Coding Techniques" Image Processing, 1999. ICIP 99. Proceedings 1999 International Conference on Kobe, Japan Oct. 24-28, 1999, Piscataway, NJ, USA, Oct. 24, 1999 pp. 349-3538.

* cited by examiner

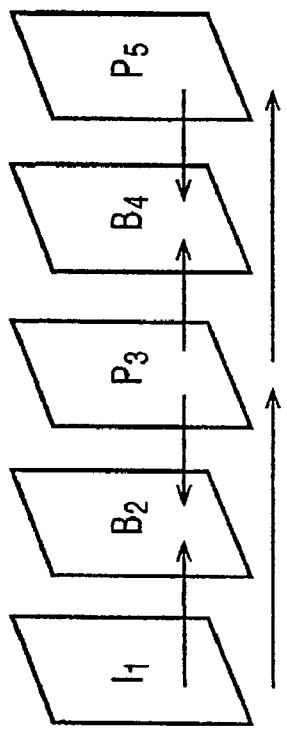
FIG. 1 Illustration of B picture prediction dependencies
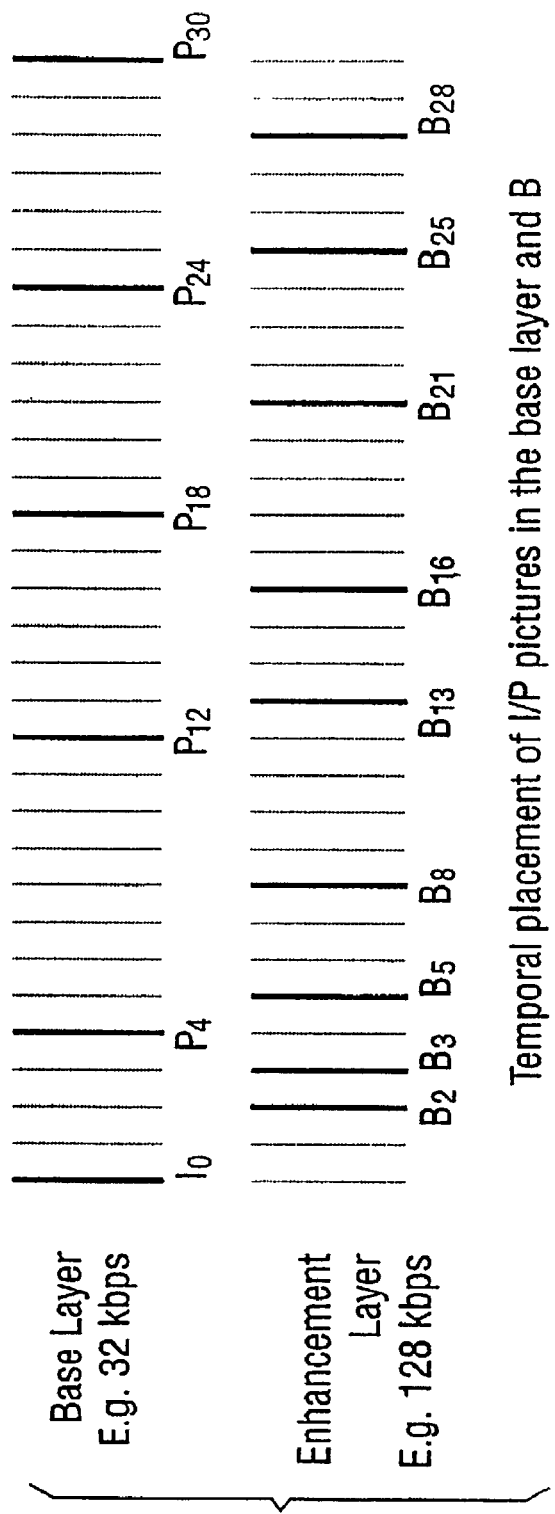
FIG. 2 Temporal placement of I/P pictures in the base layer and B pictures in the enhancement layer in the prior art method

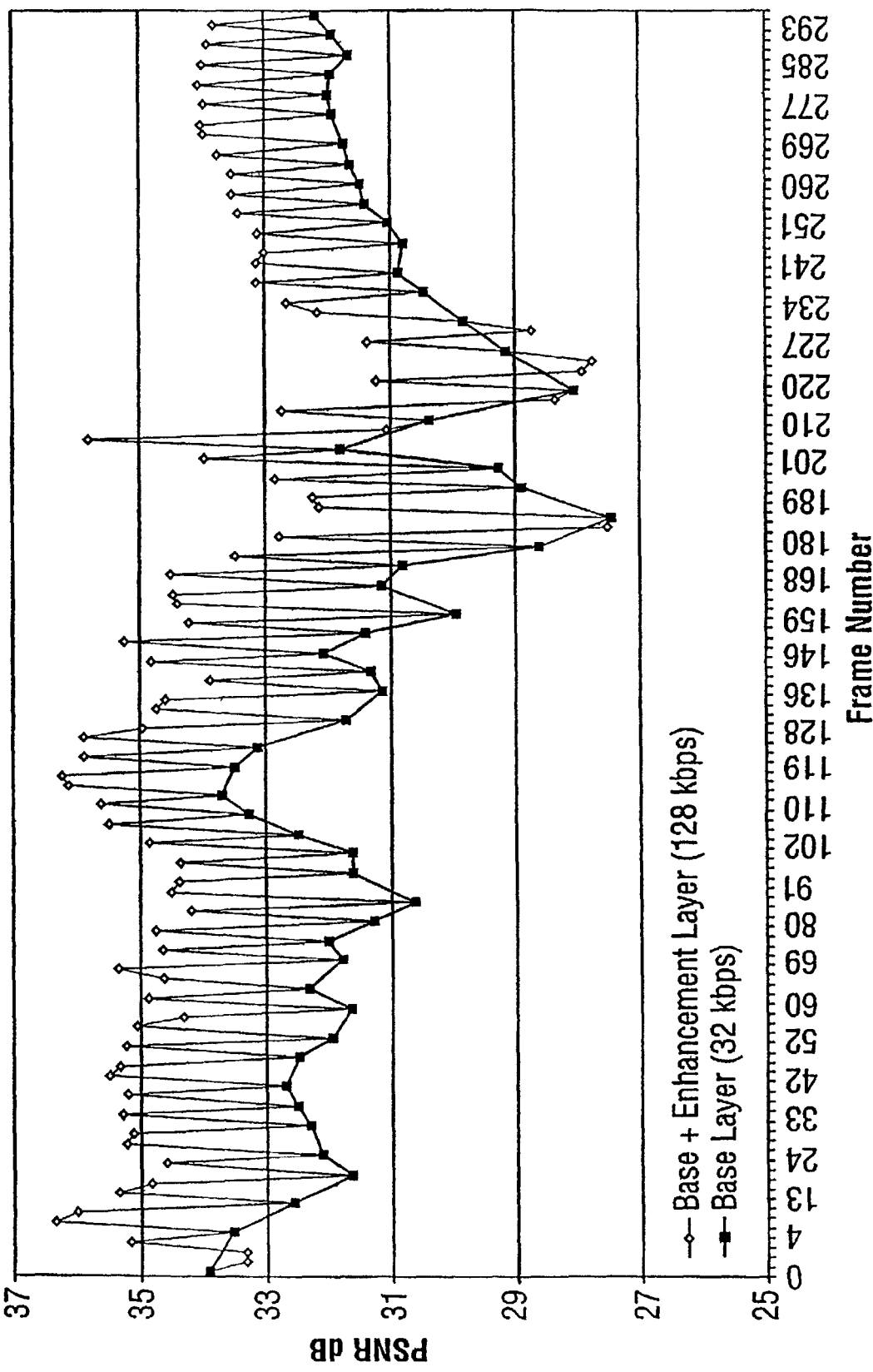
FIG. 3 A graph of PSNR of each temporally scalable coded frame in the "Foreman" QCIF sequence

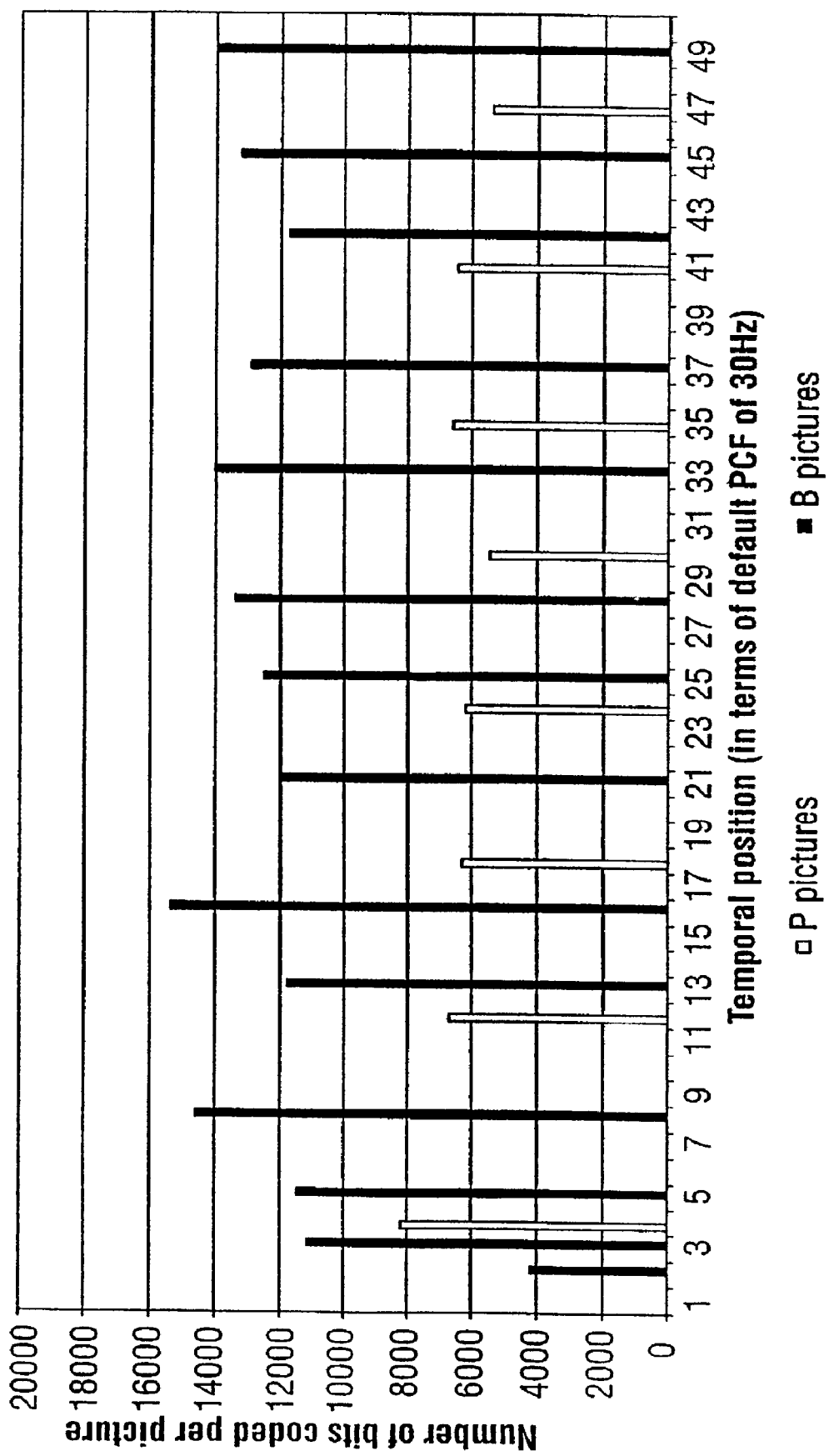
FIG. 4 The prior art method of B picture placement in a 32: 128kbps Foreman QCIF sequence, showing how the first fifty source frames are coded.

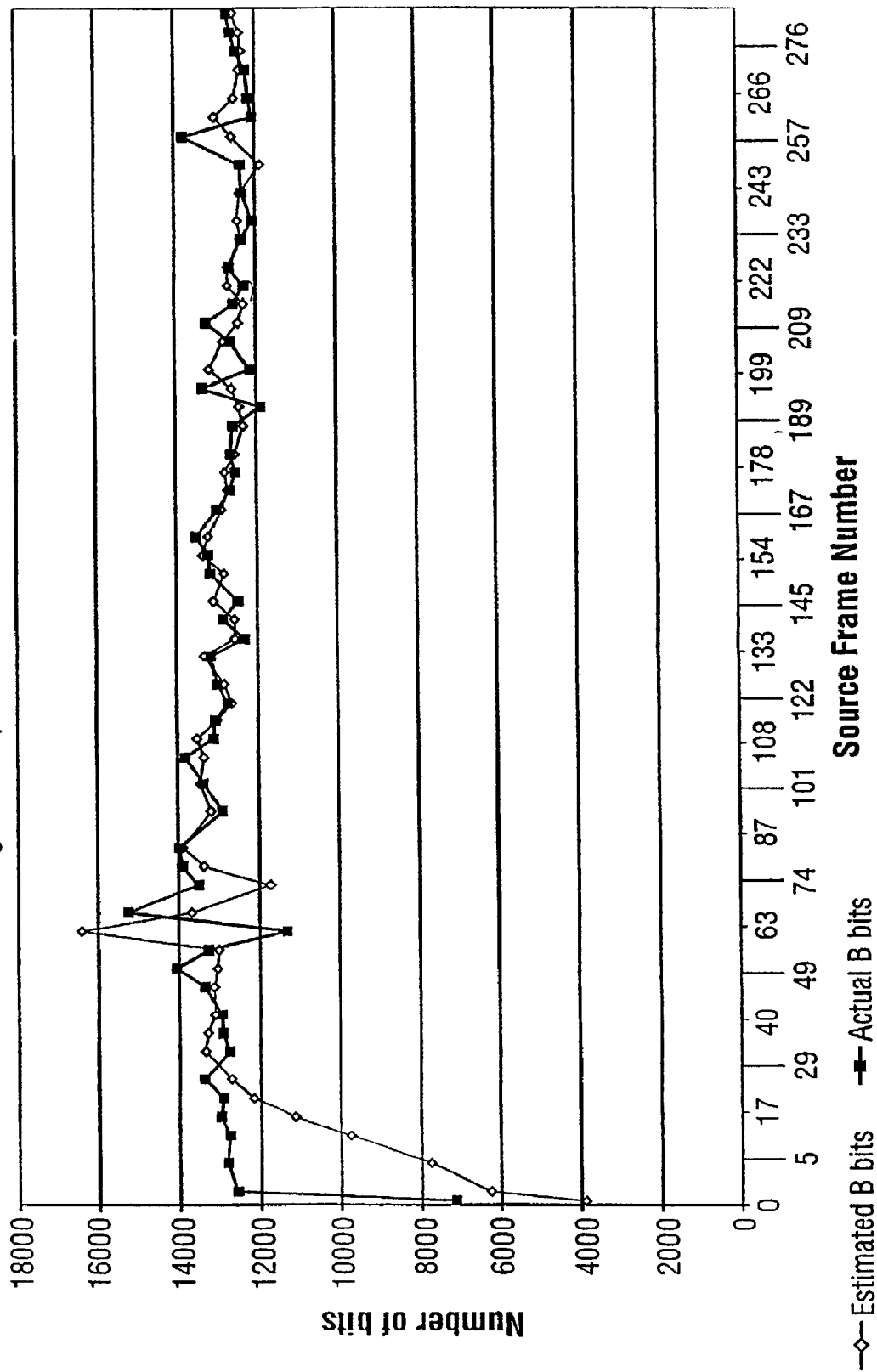
FIG. 5 Actual and estimated number of bits in a B picture over the Coastguard sequence coded at 32 and 128 kbps

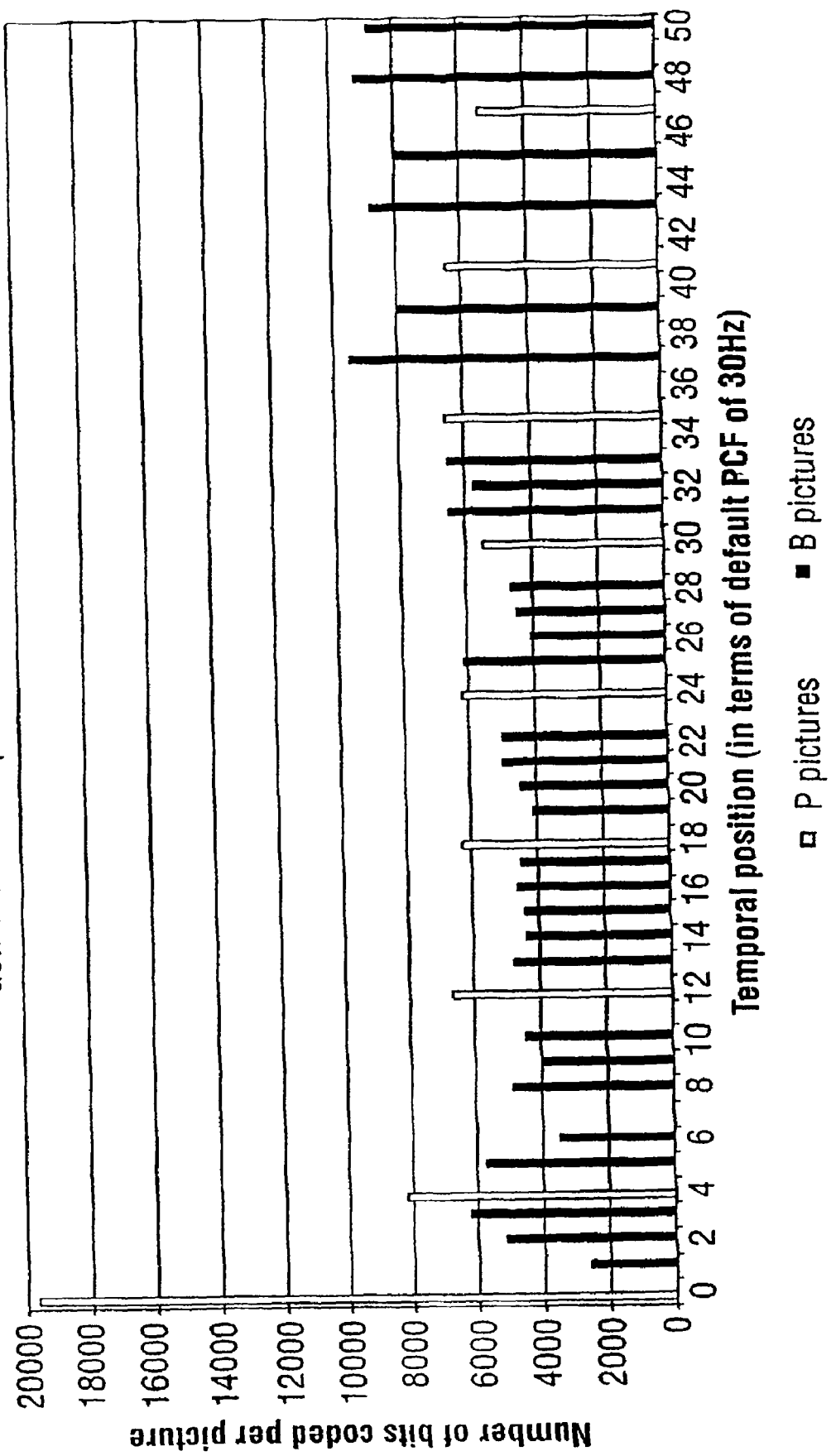
FIG. 6 B picture placement for the first fifty source frames of a QCIF Foreman sequence encoded at 32 and 128 kbps

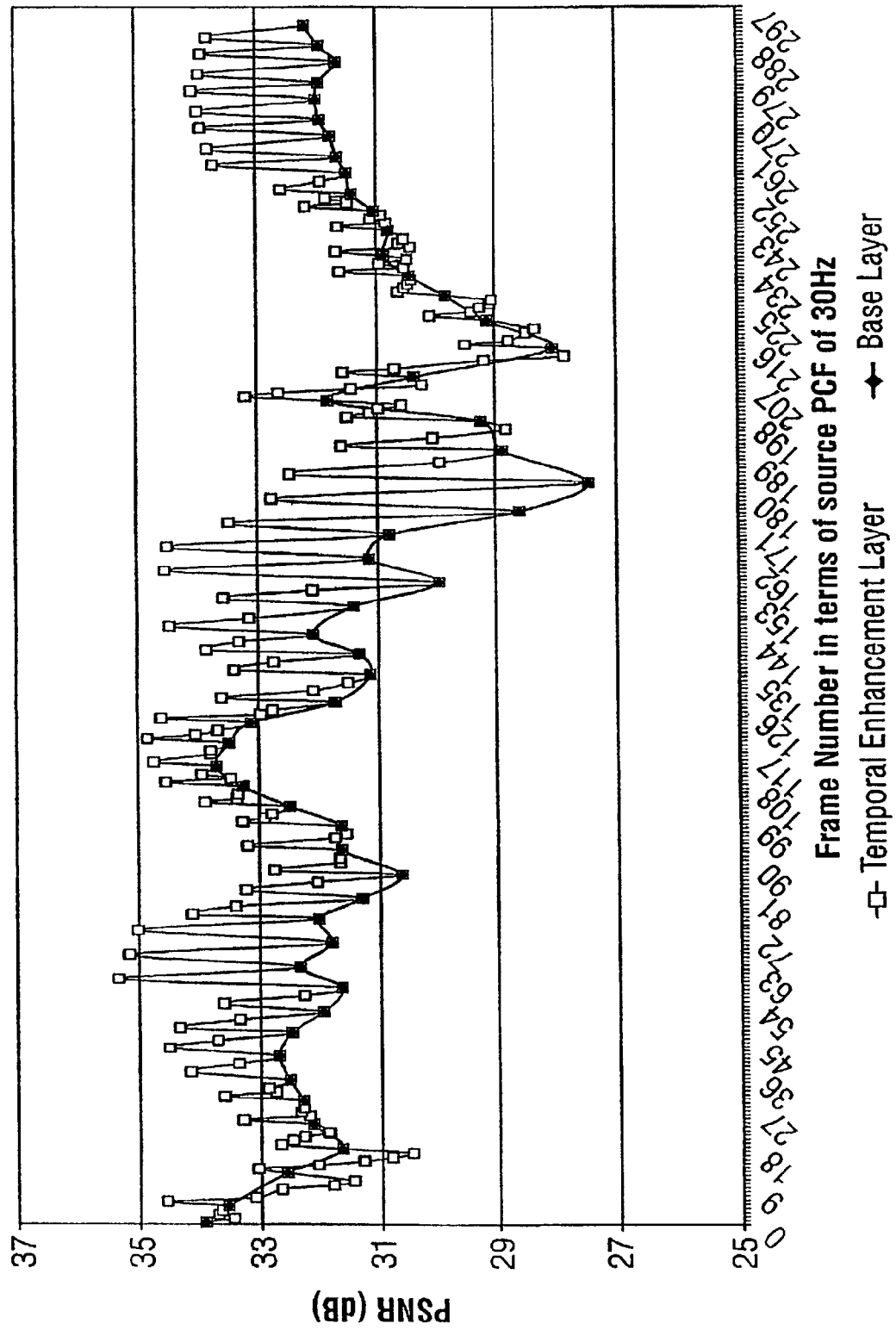
FIG. 7 PSNR for each frame of Foreman QCIF encoded at 32 & 128 kbps

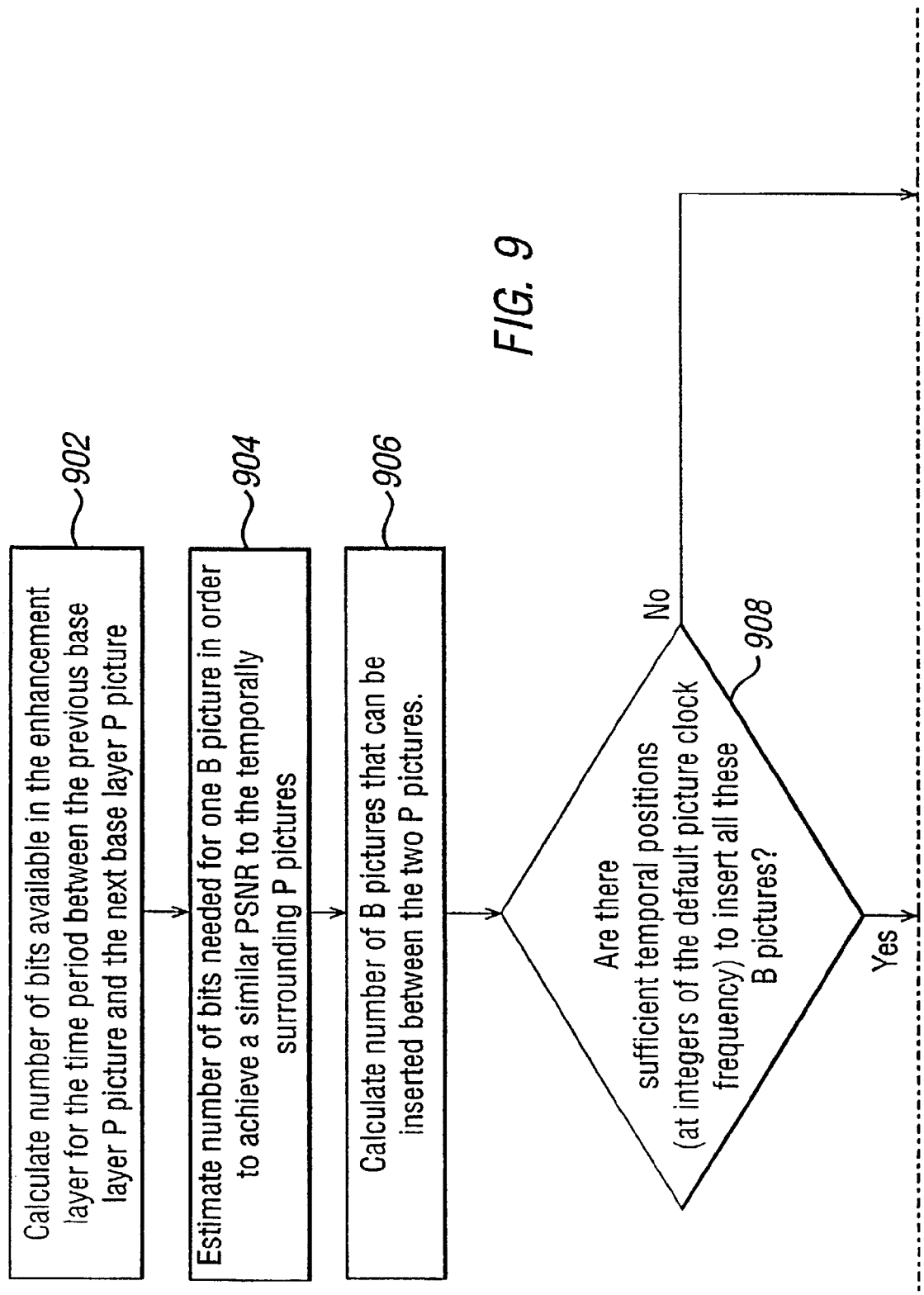

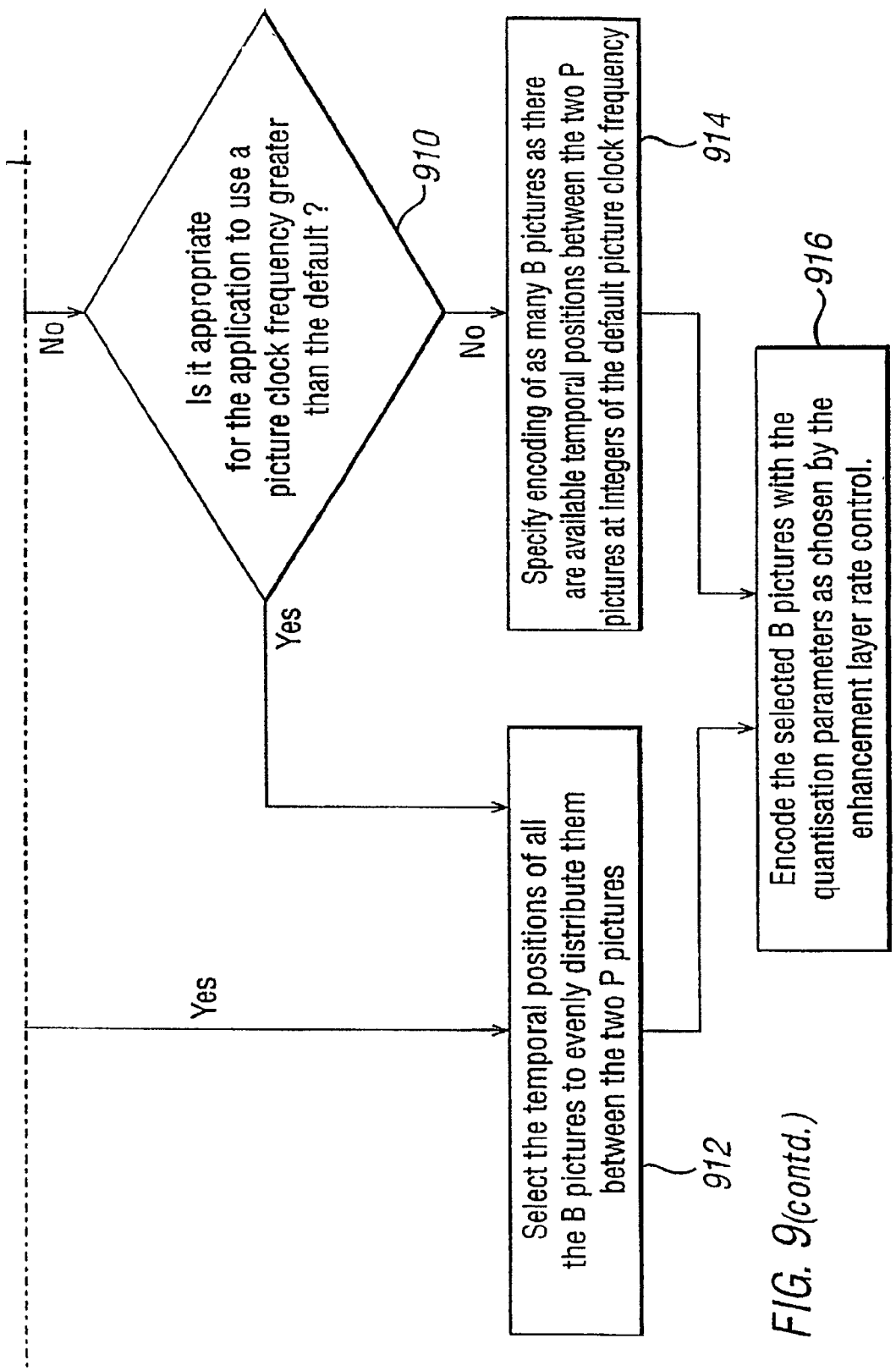
FIG. 9(contd.)

METHOD AND APPARATUS FOR VIDEO ENCODING

FIELD OF THE INVENTION

The present invention relates to video bit streams, and in particular to a method and associated means for providing improved temporal placement of B pictures in a temporally scalable video bit stream.

Although this invention is particularly relevant to traditional layered scalable video coding systems, it is equally applicable in a Fine Granular Scalable system for hybrid SNR/temporal scalability. This may be for MPEG4, or any other appropriate system.

Further, the invention can be used in any scalable video coding scheme such as H.263, MPEG4, or other future scalable video coding methods where temporal scalability is desired by the insertion of extra pictures. With this in mind, scalable video coding has particular relevance to wired, wired Internet and wireless communication, especially UMTS services in the mobile communications arena.

BACKGROUND

A 'video signal' consists of a sequence of images. Each image is referred to as a 'frame'. When a video signal Is transmitted from one location to another, it is typically transmitted as a sequence of pictures. Each frame may be sent as a single picture, however the system may need to send more than one picture to transmit all the information in one frame.

Increasingly, video signals are being transmitted over radio communication links. This transmission may be over a communication path of very limited bandwidth, for example over a communication channel between a portable or mobile radio device and a base station of a cellular communications system.

One method of reducing the bandwidth required for transmission of video is to perform particular processing of the video signal prior to transmission. However, the quality of a video signal can be affected during coding or compression of the video signal. For this reason, methods have been developed to enhance the quality of the received signal following decoding and/or decompression.

It is known, for example, to include additional 'layers' of transmission, beyond simply the base layer in which pictures are transmitted. The basic video signal is transmitted in the base layer. The additional layers are termed 'enhancement layers'. The enhancement layers contain sequences of pictures that are transmitted in addition to the basic set of pictures. These additional pictures are then used by a receiver to improve the quality of the video. The pictures transmitted in the enhancement layers may be based on the difference between the actual video signal and the video bit stream after it has been encoded by the transmitter.

The base layer of video transmission typically contains two types of picture. The first is an 'Intracoded' picture, which is often termed an I-picture. The important feature of an I-picture is that it contains all the information required for a receiver to display the current frame of the video sequence. When it receives an I-picture, the receiver can display the frame without using any data about the video sequence that it has received previously.

A P-picture contains data about the differences between one frame of the video sequence and a previous frame. Thus a P-picture constitutes an 'update'. When it receives a P-picture, a receiver displays a frame that is based on both the P-picture and data that it already holds about the video stream from previously received pictures.

If a video system employs one or more enhancement layers, then it can send a variety of different types of picture in the enhancement layer. One of these types is a 'B-picture'. A 'B-picture' differs from both I- and P-pictures. A 'B-picture' is predicted based on information from both a picture that precedes the B-picture in time in the video stream and one that follows it. The B-picture is said to be 'bi-directionally predicted'.

A B-picture is predicted based on pictures from the layer below it. Thus a system with a base layer and a single enhancement layer will predict 'B-pictures' based on earlier and later pictures in the base layer, and transmit these B-pictures in the enhancement layer. A notable feature of B-pictures is that they are disposable—the receiver does not have to have them in order to display the video sequence. In this sense they differ from P-pictures, which are also predicted, but are necessary for the receiver to reconstruct the video sequence. A further difference lies in the fact that B-pictures cannot serve as the basis for predicting further pictures.

The pictures transmitted in the enhancement layers are an optional enhancement, since the transmission scheme always allows a receiver to reconstruct the transmitted video stream using only the pictures contained in the base layer. However, any systems that have sufficient transmission bandwidth can be arranged to use these enhancement layers.

This hierarchy of base-layer pictures and enhancement pictures, partitioned into one or more layers, is referred to as a layered scalable video bit stream.

Consider as an example a temporal scalable video bit stream, with a base layer made up of an intra-coded picture (I picture) followed by inter-coded pictures (P pictures) predicted from the previous I or P picture. A temporal enhancement layer contains additional pictures inserted between the P pictures, to increase the overall frame rate of the sequence. Since it must be possible to decode the sequence at the base layer without these additional pictures, they must be coded as bi-directionally predicted pictures (B pictures), bi-directionally predicted from the previous and subsequent I or P pictures, so that they are disposable. The more bits that are allocated to each B picture, the better quality each B picture will be, in terms of peak signal-to-noise ratio (PSNR). However, the more bits that are allocated to each B picture, the fewer of them can be encoded, due to the layer having a fixed bandwidth, thus the lower the frame rate of the sequence.

An illustration of the picture prediction dependencies is shown in FIG. 1 hereinafter.

A prior art video transmission arrangement relevant to the above example is known from "H.263 Scalable Video Coding and Transmission at Very Low Bit Rates", PhD Dissertation, Faisal Ishtiaq, Northwestern University, Illinois, U.S.A., December 1999. From this arrangement, it is known to use a rate control algorithm for the base layer to determine quantisation parameters (and hence the PSNR quality of the P pictures) and number of source pictures to drop (and hence the frame rate). Similarly, the temporal enhancement layer uses a second video buffer and runs a similar rate control algorithm, with the first B picture being placed halfway between the I and the first P picture. The temporal placement of subsequent B pictures is determined by the enhancement layer rate control independently of the P pictures. Therefore the case can arise where the enhancement layer rate control wants to encode a B picture at the same temporal position as a P picture already encoded in the base layer. When this occurs, the B picture is simply encoded in the previous temporal position instead. There is no thought given to the regular distribution of the B pictures in time with respect to the P pictures. An example of temporal placement of I/P pictures in a base layer and B pictures in an enhancement layer according to the prior art method is shown in FIG. 2 hereinafter.

Since the enhancement layer rate control is run separately from the base layer rate control, this prior art method does not take into account the fact that a high bandwidth viewer sees both the base layer P pictures and the enhancement layer B pictures together as one sequence. These P pictures and B pictures may have significantly different PSNRs, thereby resulting in the viewer being presented with pictures of markedly different spatial quality. This makes the lower spatial quality P pictures particularly noticeable.

The limitations of this prior art approach are particularly apparent when the base layer has a low bit rate, so that P pictures are spaced far apart, and the temporal enhancement layer has a much higher bit rate. This means that there is an abundance of bits available to encode B pictures, so they are of much higher PSNR than the P pictures. A difference in spatial quality between the P pictures and the B pictures is then very apparent to the high bandwidth viewer when the whole sequence is played, as is shown in FIGS. 3 and 4 hereinafter.

Furthermore, as shown in FIG. 4, the pictures are not evenly distributed in time, as the enhancement layer rate control selects the position of the B pictures independently of the positioning of the P pictures, so sometimes the pictures are grouped close together in time, while at other times there could be a large time gap between pictures. This can lead to jerkiness of motion in the sequence.

The overall PSNR of all the pictures in the video sequence as a whole, and the temporal positions of all these pictures relative to each other, are important The spatial quality and placement of each B picture, alone, are not the only important factors. Hence, a problem which the inventors have appreciated and which needs to be solved is how to allocate bits to B pictures and where to position the resulting B pictures temporally, to give the best subjective video quality, given certain base and temporal enhancement layer bit rates.

SUMMARY OF THE INVENTION

With the foregoing in mind, the present invention provides a method of enhancing a video bit stream using temporal scalability, wherein peak signal to noise ratios of bidirectionally predicted pictures in an enhancement layer are determined with reference to peak signal to noise ratios of pictures in another layer.

By producing predicted pictures in an enhancement layer which have similar or matched PSNRs to those of the base layer pictures, a video sequence with smoother motion will result.

The present invention further provides a method of enhancing a video bit stream using temporal scalability, wherein a number of bits allocated to encode a picture of an enhancement layer is determined with reference to the number of bits used to encode a picture of another layer. Once again, by using a similar number of bits for each picture, a video sequence with smoother motion will result.

The invention further provides a method of enhancing a video bit stream using temporal scalability, wherein temporal positions of bidirectionally predicted pictures in an enhancement layer are determined to be spaced evenly with reference to temporal positions of pictures in another layer or layers. By arranging for the various B pictures to be evenly spaced throughout the video bit stream, an improved video sequence will result.

Preferably, the other layer is a base layer. If the scalable system has more than two layers, preferably one of the other layers is a base layer.

The pictures in the base layer are preferably either intra-coded pictures (I pictures) or inter-coded pictures (P pictures).

Each picture in the temporal enhancement layer is preferably a bi-directionally predicted picture (a B picture).

By taking into consideration the temporal positions, PSNRs and/or number of bits associated with a picture of the base layer, the bidirectionally predicted pictures can be positioned evenly between the pictures of the base layer with PSNRs of similar magnitude and allocated an appropriate number of bits to give them a PSNR of similar magnitude to the base layer pictures.

According to the present invention, there is also provided an apparatus, such as an encoder, which implements any one or more aspect of the methods according to the present invention.

BRIEF DESCRIPTION OF THE DRAWINGS

In the drawings, the 'Coastguard' and 'Foreman' sequences are standard test sequences of video images. These are familiar to persons skilled in the art of video transmission.

FIG. 1 is an illustration of B picture prediction dependencies in a video bit stream using temporal scalability;

FIG. 2 shows typical temporal placement of I/P pictures in a base layer and B pictures in an enhancement layer in a method according to the prior art;

FIG. 3 is a graph of PSNR for each temporally scalable coded picture in the "Foreman" QCIF sequence;

FIG. 4 shows how the first fifty source pictures of FIG. 3 are coded using the prior art method of B picture placement in a 32:128 kbps 'Foreman' QCIF sequence;

FIG. 5 shows a graph of actual and estimated number of bits in a B picture over the "Coastguard;" sequence coded at 32 and 128 kbps;

FIG. 6 is a graph similar to that of FIG. 4, but this time showing the results of B picture placement according to the present invention;

FIG. 7 is a graph similar to that of FIG. 3, but showing the PSNR for each picture of the "Foreman" QCIF sequence when the method of the present invention is used;

FIG. 9 is a flow chart in accordance with the present invention-showing how the number and temporal positions of B pictures are chosen;

DETAILED DESCRIPTION OF AN EMBODIMENT OF THE INVENTION

Figure 8:
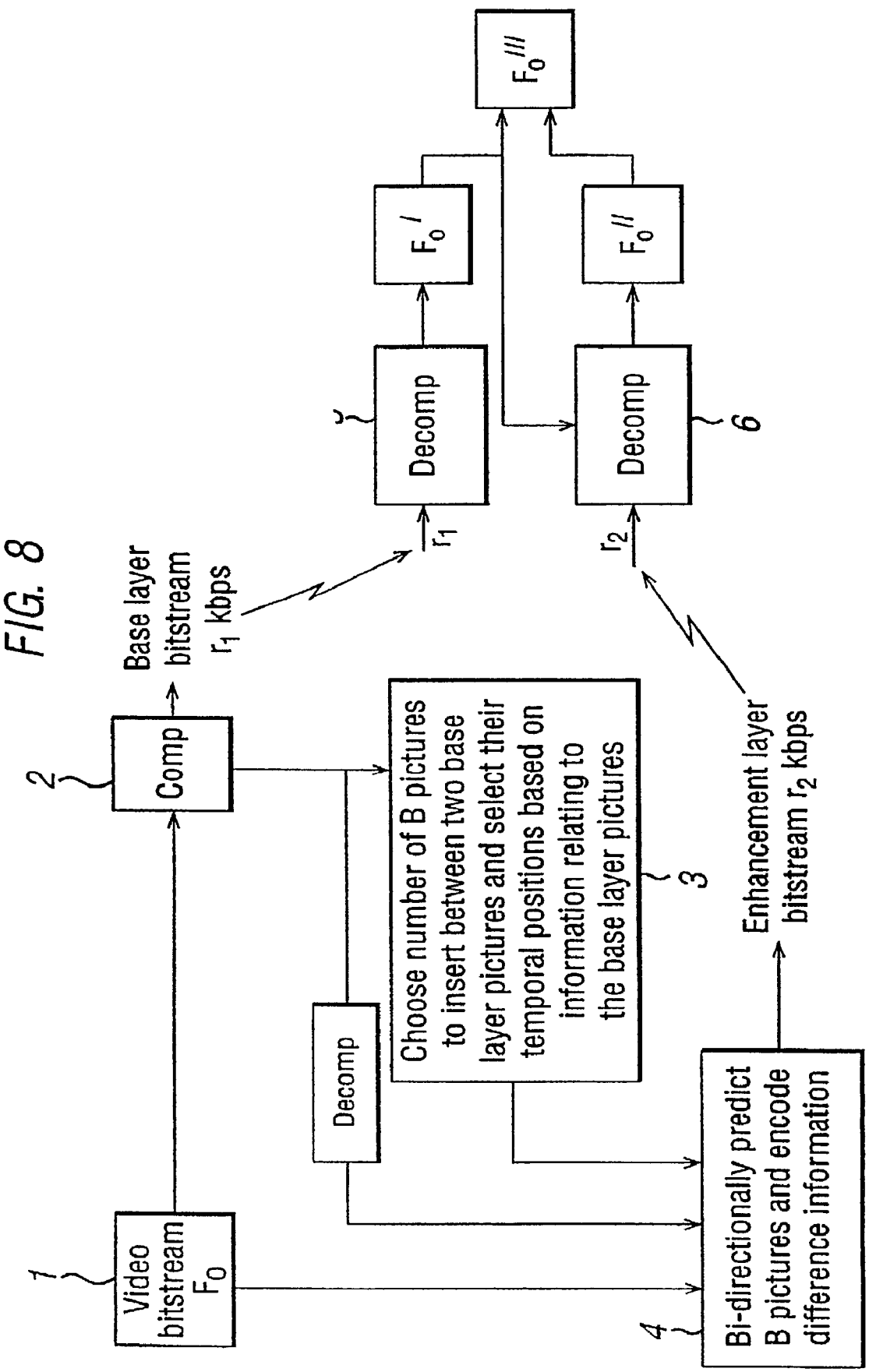
FIG. 8 is a schematic representation of an apparatus which uses a method according to the present invention.

As mentioned above, an enhancement layer rate control and a base layer rate control are used. According to the present invention, the base layer rate control is run as in the prior art method. It selects which pictures to drop from the source video sequence, and which P pictures to encode, varying the quantisation parameter to meet the bit budget. After encoding the I picture and the first P picture in the base layer, the enhancement layer rate control is run separately using a second video buffer. This determines the number of bits available to the enhancement layer over the time period between the I and the first P picture. The number of bits that each B picture will use is estimated as being 0.5*P_bits, where P_bits is the number of bits used to encode the P picture. In later estimates, when there is a temporally previous as well as subsequent P picture, the estimate is made by a weighted average of the number of bits in both P pictures. In this first step, however, the number of bits in the I picture is not taken into account, as it will be far higher than the number of bits in a P or B picture, since absolute rather than difference values are encoded in an I picture.

Experiments on temporal scalability have shown that to achieve approximately the same PSNR for B pictures as for P pictures, when inserting one B picture between a pair of P pictures, the bit rate of the temporal enhancement layer should be approximately half that of the base layer. That is, the ratio of average number of bits in a B picture to average number of bits in a P picture should be 0.5. Based on this observation, an initial weighting value of 0.5 is chosen.

After the first B picture(s) are encoded and the second P picture is encoded in the base-layer, the weighting value is updated, so that it becomes a cumulative average of the ratio of B_bits to P_bits;

$$\text{cumulative\_average}_{current} = \left( \frac{\text{B\_bits}_{current}}{\text{P\_bits}_{current}} + \text{cumulative\_average}_{previous} \right) / 2$$

where $$\text{cumulative\_average}_{initial} = \frac{\text{B\_bits}_{initial}}{\text{P\_bits}_{initial}}$$

The value of P_bits is the average number of bits in the immediately preceding and the immediately following P picture relative to the B pictures being inserted. The value of B_bits is the average number of bits used to encode one B picture to be inserted between the two P pictures whose average is P_bits-P_bits$_{current}$ refers to the average number of bits in the immediately preceding and the immediately following P picture relative to the B pictures being inserted in the current calculation. B_bits$_{current}$ refers to the average number of bits used to encode one B picture that has just been inserted between the two P pictures whose average is P_bits$_{current}$.

In the initial step, the B pictures are being inserted between the I and the first P picture. Only the number of bits in the P picture is included in the calculation. The number of bits in the I picture, which will be much higher, is not included. If more than one B picture is inserted between two P pictures, the value of B_bits is the average number of bits over all the B pictures in that interval.

Then the following estimate can be made:

$$\hat{B}_{current} = \text{cumulative\_average}_{previous} * \text{P\_bits}_{current}$$

where $$\hat{B}_{initial} = 0.5 * \text{P\_bits}_{initial}$$

FIG. 5 compares the estimate to the actual number of bits encoded per B picture in the 'Coastguard' sequence. A very high degree of accuracy in the estimate is unnecessary, since it is only necessary to use this estimate to calculate the number of B pictures to encode, which will be rounded down to the nearest integer anyway.

This calculation provides the number of bits available for encoding B pictures between the I and P picture (or in subsequent steps, the two P pictures), and provides an estimate of the number of bits each B picture will use, so we can calculate the number of B pictures that can be inserted between the I and P pictures. Then, the B pictures are encoded at temporal positions which are equal time intervals between the I and P pictures. As shown in FIGS. 6 and 7, this invention results in a more temporally even distribution of pictures, with a B picture PSNR more similar to that of the P pictures than was possible using the prior art method. Subjectively, this means that the viewer does not notice a degradation in spatial quality each time a P picture is presented, rather all pictures are of a similar spatial quality, which is more pleasing to the eye, and there is a higher picture rate than using the prior art method. Since the human visual system places a relatively high weight on motion, this is a significant result.

FIG. 8 shows a schematic representation of an apparatus embodying the present invention. In the figure, a video bit stream $F_0$ is input at 1 and the source pictures that the base layer rate control selects for encoding are compressed at 2 to produce a base layer bit stream signal to be transmitted at a rate $r_1$ kbps. At 3, the number of bits from each picture in the base layer bit stream is used according to the flow chart in FIG. 9 to choose the number of B pictures to insert between two base layer pictures and to select their temporal positions. At 4, the source pictures from the video bit stream $F_0$ from 1 are used along with the decompressed and reconstructed base layer pictures to bidirectionally predict the chosen number of B pictures using known temporal scalability methods and encode the difference information (916). This produces an enhancement layer bit stream signal to be transmitted at a rate of $r_2$ kbps. Following transmission of the base layer and enhancement layer bit streams, the base layer bitstream is decompressed at 5, producing reconstructed base layer pictures $F_0'$ and then these are used along with the enhancement layer bit stream at 6 to reconstruct the B pictures $F_0''$. By inserting the B pictures $F_0''$ in between the I and P pictures $F_0'$, the final reconstructed output $F_0'''$ is produced.

Although the present invention has been described above in general, in some cases, for example where there is very fast motion (e.g. sports events) or where special effects may be required at the receiver (e.g. slow motion), it is desirable to display the received sequence at a higher picture rate than the source video picture rate. In these cases, the invention has particular advantage since it enables more B pictures to be inserted (908) than with the prior art method and enables the possibility of increasing the frame rate beyond the source frame rate.

The invention may be modified such that the reference picture clock frequency is increased (910) (for example, it could be doubled from the 30 Hz source frame rate, used as the default picture dock frequency, to 60 Hz) which creates additional placement locations for the B pictures (914). This method has particular advantage in scalable coding schemes where there is a very large difference between the base layer rate and the base plus enhancement layer (e.g. 32 kbps and 384 kbps respectively), as it enables motion to be tracked effectively with as high a frame rate as possible. It also keeps the allocation of bits to each B picture low enough such that their PSNR is comparable to the PSNR of the surrounding P pictures and not noticeably higher, as a subjective quality difference between the inserted B pictures and the base layer I/P pictures will be extremely annoying to a viewer.

As will be appreciated from the foregoing, the present invention takes into account (902) the coding of P pictures that has already taken place in the base layer when encoding the enhancement layer B pictures. It estimates (904) the number of bits to be used to encode a B picture, given the number of bits used to encode the immediately preceding P picture and the immediately following P picture, so as to generate a B picture with a similar PSNR to its surrounding P pictures. Therefore, the number of B pictures to be inserted between the two P pictures can be calculated (906). The temporal position of the B pictures between the two P pictures can then be selected (912), so as to distribute evenly the B pictures in time, and reduce jerkiness of the sequence.

Furthermore, the invention is not limited to traditional layered scalable video coding, as described above, but is equally applicable in a Fine Granular Scalable system for hybrid SNR/temporal scalability as described for MPEG4, for example. This case would simply require the use of a different estimator for the number of bits used per B picture, as the relationship between B pictures (or in this case FGS-T pictures) and P pictures (or in this case FGS enhancements) would be different to the case described above.

The invention can be used in any scalable video coding scheme such as H.263, MPEG4 or future scalable video coding methods where temporal scalability is desired by the insertion of extra pictures. It provides increased subjective video quality in a standards compliant manner. Further, the invention is particularly relevant to wired (internet) and wireless communication, especially UMTS services. Other mobile communications systems may also take advantage of the present invention whenever video signals are to be transmitted.

Whilst the above method has been described generally with reference to ad-hoc systems, it will be clear to the reader that it may apply equally to communications systems which utilise a managing infrastructure. It will be equally appreciated that apparatus able to carry out the above method is included within the scope of the invention. A description of such apparatus is as follows.

Figure 10:
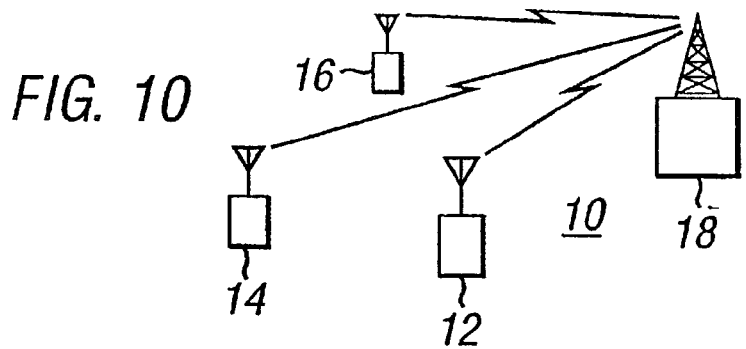
FIG. 10 illustrates the general scheme of a wireless communications system which could take advantage of the present invention.

An example of a wireless communications system 10 which could take advantage of the present invention is shown in FIG. 10. Mobile stations 12, 14 and 16 of FIG. 10 can communication with a base station 18. Mobile stations 12, 14 and 16 could be mobile telephones with video facility, video cameras or the like.

Each of the mobile stations shown in FIG. 10 can communicate through base station 18 with one or more other mobile stations. If mobile stations 12, 14 and 16 are capable of direct mode operation, then they may communicate directly with one another or with other mobile stations, without the communication link passing through base station 18.

Figure 11:
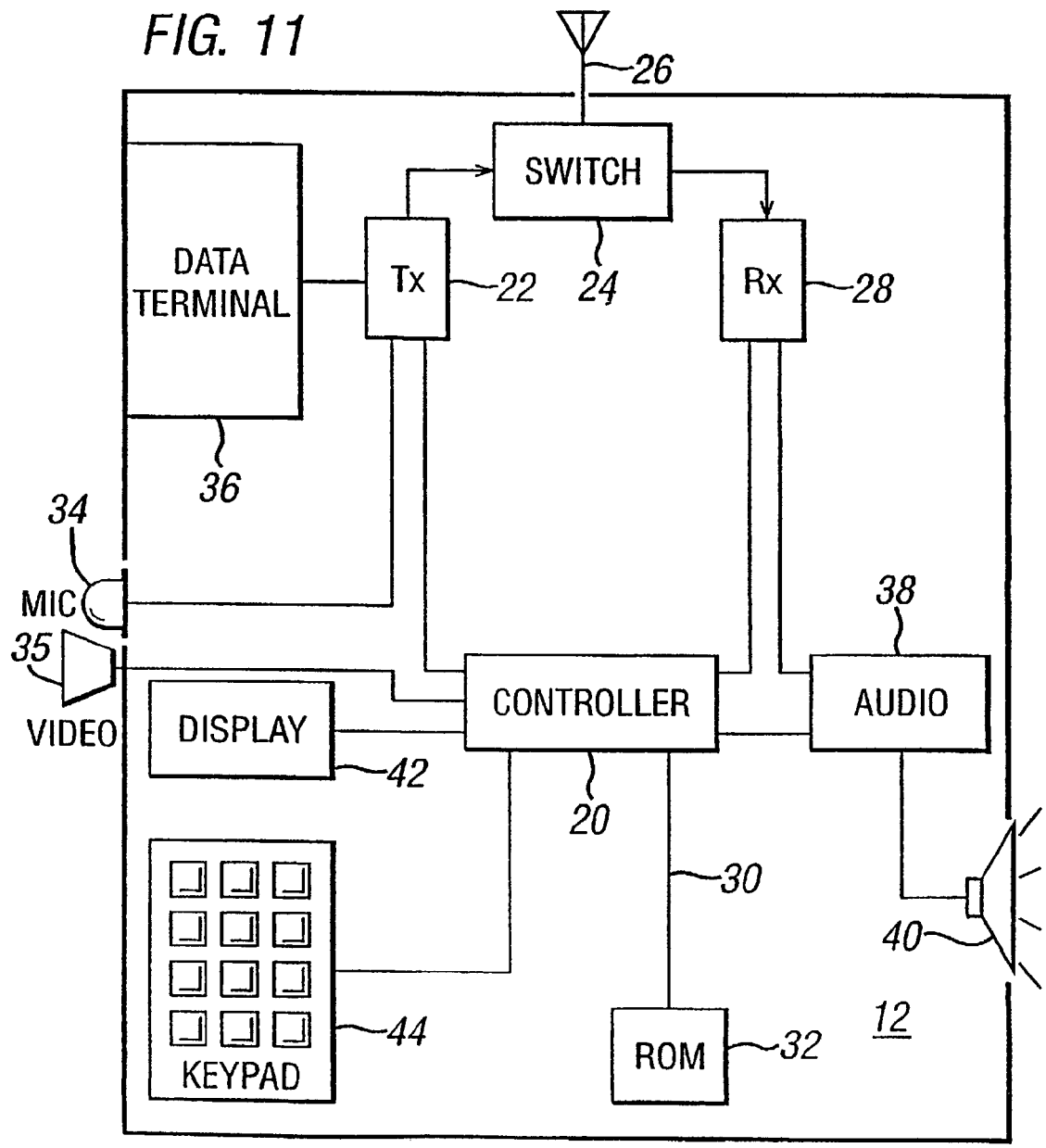
FIG. 11 illustrates a mobile station (MS) which uses the method according to the present invention.

FIG. 11 illustrates a mobile station (MS) in accordance with the present invention. The mobile station (MS) of FIG. 11 is a radio communication device, and may be either a portable or a mobile radio, or a mobile telephone, with video facility, or a video camera with communications facility.

The mobile station 12 of FIG. 11 can transmit sound and/or video signals from a user of the mobile station. The mobile station comprises a microphone 34, which provides a sound signal, and a video camera 35, which provides a video signal, for transmission by the mobile station. The signal from the microphone is transmitted by transmission circuit 22. Transmission circuit 22 transmits via switch 24 and antenna 26.

In contrast, the video signal from camera 35 is first processed using a method according to the present invention by controller 20, which may be a microprocessor, possibly in combination with a read only memory (ROM) 32, before passing to the transmission circuit 22 for onward transmission via switch 24 and antenna 26.

ROM 32 is a permanent memory, and may be a non-volatile Electrically Erasable Programmable Read Only Memory (EEPROM). ROM 32 is connected to controller 20 via line 30.

The mobile station 12 of FIG. 11 also comprises a display 42 and keypad 44, which serve as part of the user interface circuitry of the mobile station. At least the keypad 44 portion of the user interface circuitry is activatable by the user. Voice activation of the mobile station may also be employed. Similarly, other means of interaction with a user may be used, such as for example a touch sensitive screen.

Signals received by the mobile station are routed by the switch to receiving circuitry 28. From there, the received signals are routed to controller 20 and audio processing circuitry 38. A loudspeaker 40 is connected to audio circuit 38. Loudspeaker 40 forms a further part of the user interface.

A data terminal 36 may be provided. Terminal 36 would provide a signal comprising data for transmission by transmitter circuit 22, switch 24 and antenna 26. Data received by receiving circuitry 28 may also be provided to terminal 36. The connection to enable this has been omitted from FIG. 11 for clarity of illustration.

It will of course be understood that the present invention has been described above purely by way of example, and that modifications of detail can be made within the scope of the invention.

The invention claimed is:

1. A method of enhancing a video bit stream using temporal scalability, wherein peak signal-to-noise ratios of bidirectionally predicted pictures in an enhancement layer are determined with reference to the peak signal-to-noise ratios of pictures in another layer.

2. A method of enhancing a video bit stream using temporal scalability, wherein the number of bits allocated to encode a bidirectionally predicted picture of an enhancement layer is determined with reference to the number of bits used to encode a picture of another layer.

3. A method of enhancing a video bit stream using temporal scalability, wherein temporal positions of bidirectionally predicted pictures in an enhancement layer are determined to be spaced evenly with reference to temporal positions of pictures in other layers.

4. A method as claimed in claim 1, wherein the peak signal-to-noise ratios are made similar.

5. A method as claimed claim 1, wherein the other layer is a base layer.

6. A method as claimed in claim 1, wherein characteristics of more than one picture in another layer are considered.

7. A method as claimed in claim 1, wherein:
   (i) a first enhancement layer uses SNR scalability to produce enhanced pictures; and
   (ii) a second enhancement layer uses temporal scalability to produce enhanced pictures, based on temporal positions of pictures in the first lower enhancement layer.

8. A method as claimed in claim 1, wherein an average number of bits used to define a predicted picture and an average number of bits used to define a picture in the another layer are used to define a weighting value.

9. An apparatus which implements a method according to claim 1, the apparatus including:
   means for selecting temporal position, PSNR and/or number of bits of a bidirectionally predicted picture based on information relating to a picture in another layer.

10. An apparatus as claimed in claim 9, which is adapted to encode video signal for transmission via a mobile communications system.

* * * * *

UNITED STATES PATENT AND TRADEMARK OFFICE
CERTIFICATE OF CORRECTION

PATENT NO. : 7,844,000 B2
APPLICATION NO. : 10/070069
DATED : November 30, 2010
INVENTOR(S) : Dolbear et al.

Page 1 of 2

It is certified that error appears in the above-identified patent and that said Letters Patent is hereby corrected as shown below:

On the Title Page, Item (75), under "Inventors", in Column 1, Line 1,
delete "Reading" and insert -- Berkshire --, therefor.

On the Title Page, in Item (75), under "Inventors", in Column 1, Line 2, delete "Alton"
and insert -- Basingstoke, Hampshire --, therefor.

On the Title Page, in Item (56), under "OTHER PUBLICATIONS" in Column 2, Line 2, delete
"Standradization" and insert -- Standardization --, therefor.

On the Title Page, in Item (57), under "ABSTRACT" in Column 2, Line 1, delete "enchancing" and
insert -- enhancing --, therefor.

In the Drawings

In Fig. 8, Sheet 7 of 10, delete Tag " ✔ " and insert Tag -- 5 --, therefor.

In the Specifications

In Column 1, Line 20, delete "Internet" and insert -- internet --, therefor.

In Column 1, Line 26, delete "signal Is" and insert -- signal is --, therefor.

In Column 3, Line 33, delete "important" and insert -- important. --, therefor.

In Column 4, Line 37, delete ""Coastguard;"" and insert -- "Coastguard" --, therefor.

In Column 5, Line 23, delete "P_bits;" and insert -- P_bits: --, therefor.

In Column 5, Line 40, delete "P_bits-P_bits$_{current}$" and insert -- P_bits. P_bits$_{current}$ --, therefor.

Signed and Sealed this
Sixteenth Day of April, 2013

Teresa Stanek Rea
*Acting Director of the United States Patent and Trademark Office*

CERTIFICATE OF CORRECTION (continued)
U.S. Pat. No. 7,844,000 B2

In Column 6, Line 51, delete "dock" and insert -- clock --, therefor.

In the Claims

In Column 8, Line 35, in Claim 5, delete "claimed claim" and insert -- claimed in claim --, therefor.